United States Patent [19]

Meyers et al.

[11] Patent Number: 5,734,368
[45] Date of Patent: Mar. 31, 1998

[54] SYSTEM AND METHOD FOR RENDERING A COLOR IMAGE

[75] Inventors: Patrick F. P. Meyers, Eindhoven; Evert J. Pol, Utrecht; Marinus Van Splunter, Eindhoven, all of Netherlands

[73] Assignee: U.S. Philips Corporation, New York, N.Y.

[21] Appl. No.: 293,634

[22] Filed: Aug. 18, 1994

[30] Foreign Application Priority Data

Aug. 18, 1993 [EP] European Pat. Off. ............ 93202426

[51] Int. Cl.$^6$ ...................................................... G09G 5/06
[52] U.S. Cl. ................................................ 345/155; 153/199
[58] Field of Search .............................. 345/153, 154, 345/155, 199; 395/131; 382/167

[56] References Cited

U.S. PATENT DOCUMENTS

| 5,341,464 | 8/1994 | Friedman et al. | 345/155 |
| 5,365,252 | 11/1994 | Lo | 345/153 |
| 5,394,518 | 2/1995 | Friedman et al. | 345/155 |
| 5,455,600 | 10/1995 | Friedman et al. | 345/153 |
| 5,561,751 | 10/1996 | Wong | 395/131 |

FOREIGN PATENT DOCUMENTS 0581514  2/1994  European Pat. Off. .

Primary Examiner—Richard Hjerpe
Assistant Examiner—Ricardo Osorio
Attorney, Agent, or Firm—Debra K. Stephens

[57] ABSTRACT

An image rendering system renders a color image in which each pixel is associated with a respective aim color value. A quantizer selecta a respective quantized value indicating a color from a palette of colors for each pixel, in dependence on the aim color value associated with that pixel. The pixels are rendered with the colors indicated by the respective quantized values. The palette consists of a proper subset of the set of all colors that the aim color values can represent, and contains at least one palette color which does not lie on an RGB boundary, and is perceptually closer than any other of the palette color values to an RGB boundary color belonging to said set. For pixels for which the aim color value represents said RGB boundary color the quantizer means selects a quantized value indicating a further palette color, that lies on the RGB boundary.

11 Claims, 3 Drawing Sheets

5,734,368

1

SYSTEM AND METHOD FOR RENDERING A COLOR IMAGE

BACKGROUND OF THE INVENTION

The invention relates to a device and method for rendering a color image.

A color image is conventionally represented by assigning a color value to each pixel in the image (the word "color value" will be used to refer both to luminance and chromaticity). To represent a full palette of colors, the color value should be a three component vector, its components representing for example the intensities of the three primary colors used to render the color value or YUV color coordinates. Because three components have to be provided, a considerable amount of information is required to represent the image with a full palette of colors. This is disadvantageous for the transmission and storage of images, moreover many image display devices cannot render this full palette.

Because of this it has been found convenient to store and render the color image using a reduced palette of colors containing fewer colors than the full palette of colors. In this way, the image is represented by assigning to each pixel an indication selecting the color value from the reduced palette. Because the reduced palette is smaller than the full palette the amount of information needed to represent the image is thus reduced.

In principle, starting from the original color values assigned to the pixels in an image represented using the full palette, the representation using the reduced palette can be obtained by selecting for each pixel a corresponding quantized value indicating a color from the reduced palette that lies perceptually closest to the original color value assigned to the pixel. This process is called quantization and introduces color quantization errors.

The visibility of color errors can be lessened by ensuring that the local spatial and/or temporal average of the image as represented by the reduced palette is equal to that of the original image in the full palette. This technique is called "dithering". For its effectiveness, dithering relies on the tendency of the human visual system to perform local (spatial or temporal) averaging of image information.

Dithering can be implemented in various ways, for example by a technique called "ordered dithering" which involves adding a matrix of quasi random vectors to the original color values prior to quantization. In another approach, called "error diffusion dithering", the color value of a pixel is first quantized with a consequent color error, and subsequently the opposite or the color error is spatially and/or temporally distributed among pixels surrounding the quantized pixels, by adding corrections to the color values of these pixels, (the sum of the corrections being equal to the opposite of the color error), after that the new color values of these surrounding pixels are quantized.

However, when a reduced palette is used, a certain amount of color error remains inevitable; this error increases as the size of the palette deceases. It is therefore always necessary to make a trade-off between size reduction of the palette and image quality.

SUMMARY OF THE INVENTION

Inter alia, it is an object of the invention to provide for a device and method for color dithering in which the size of the palette can be further reduced, while introducing as little as possible visible color errors.

2

It has been found that to achieve the object, special attention needs to be paid to so-called RGB boundary color values. The RGB components of a color describe the intensities of the primary colors used to render a color value. RGB boundary colors are colors in which at least one of the RGB components is minimal (generally zero) or maximal. An example of an RGB boundary color value is a saturated color value.

It has been found that in order to reduce palette size it is advantageous to use a palette containing a non-RGB boundary palette color value that is not itself a boundary color value, but lies closer to a boundary color value than any of the other color values from the palette.

However, when combined with normal dithering, the use of such a palette color leads to color errors that cannot be corrected by dithering. When a pixel and its surroundings have the boundary color value as original color value, and this pixel is assigned the non-boundary palette color value as quantized color value, no amount of dithering can cause the locally averaged color value to be equal to the original color value. This applies as well to a class of color values which lie closer to a boundary color value than to the said non-boundary palette color value and lie closer to that non-boundary palette color value than to any of the other color values from the palette.

To solve this problem, the invention provides for an image rendering system, for rendering an image in which each pixel is associated with a respective aim color value, the system comprising
- quantizing means, for mapping each aim color value to a quantized color generally lying perceptually closest to the aim color value in a palette,
- a rendering device, for rendering the pixels with the quantized colors, wherein the palette consists of a proper subset of the set of colors that the aim color values can represent, and contains at least one non-RGB boundary color which is perceptually closer to an RGB boundary color belonging to said set than any other of the colors in the palette, and wherein, in case the aim color value lies on the RGB boundary and the closest color in the palette does not lie on the RGB boundary, the quantized color mapped to is a next closest color in the palette that also lies on the RGB boundary.

The invention also provides for an image rendering system, the quantizing means comprising first and second sub-quantizing means for mapping the aim color value for boundary colors and for other colors respectively, and boundary detection means, for detecting pixels whose aim color value lies on the RGB boundary, and for in dependence upon said detecting selecting which of the first and the second subquantizing means determines the quantized color for the rendering device. It has been found that the best way to implement the different treatment of boundary colors and non-boundary colors is to provide a different quantizer for each of them.

The selection of quantized color values is preferably performed using a look-up table. A look up table operates as a memory, to which the color value is supplied as an address. At the location thus addressed with a color value, an indication of the corresponding quantized color value is stored. When the original color values are from a full palette, each of the RGB components for example being represented by an eight bit value, the look up table may be impractically large.

To solve this problem, the invention also provides for an image rendering system, the second subquantizing means comprising a first and a second quantizing stage, the first quantizing stage being arranged for determining quantized individual color components values from respective color component values of the aim color value, the second quantizing stage being arranged for determining the quantized color in dependence on the quantized individual color components. By using quantized components the number of different colors that the second stage must be able to handle is reduced relative to the total number of possible colors; the second stage can therefore be simplified. As the first stage only needs to handle individual color components it does not require an excessive overhead.

An embodiment provides for an image rendering system the first quantizing stage being arranged for quantizing color component values representing relatively lower color intensities with lesser maximum quantization error in the color value than color component values representing relatively lower color intensities. This leads to smaller perceptible color errors, because the human eye is more sensitive to differences between low intensity colors.

The invention also provides for an image rendering system the first quantizing stage being arranged for replacing a most significant part of a bit pattern representing the color component value with a label having a bit length which increases as the value of the most significant part increases, and complementing the label with a number of lesser significant bits of the bit pattern representing the color component value so as to form a bit pattern having a predetermined bit length independent of the label, representing the quantized individual component. Thus for example the following replacement is performed:

$$(0,0,x_5,x_4,x_3,x_2,x_1,x_0) \to (0,x_5,x_4,x_3,x_2,x_1,x_0)$$

$$(0,1,x_5,x_4,x_3,x_2,x_1,x_0) \to (1,0,x_5,x_4,x_3,x_2,x_1)$$

$$(1,x_6,x_5,x_4,x_3,x_2,x_1,x_0) \to (1,1,x_6,x_5,x_4,x_3,x_2)$$

The labels being 0, 10 and 11. This is particularly easy to implement.

The invention can be combined both with ordered dithering and error diffusion dithering. In both case the aim color value is obtained from the original color value by adding an offset that provides for the dithering effect. However, error diffusion dithering is preferred because it yields the best effect.

Preferably, the second subquantizing means comprising a further first and a further second quantizing stage, the further first quantizing stage being arranged for determining quantized individual color components values from respective color component values of the aim color value, with a maximum quantization error which is substantially independent of intensity, the second quantizing stage being arranged for determining the quantized value in dependence on the quantized individual color components. In case of a two stage quantizer, in which at least the second stage is implemented as a lookup table, the quantization errors can be obtained by adding the errors caused by the individual stages.

The invention also relates to individual quantization means, which can be used for example as an input to a transmission channel or to a storage device, for transmitting or storing the image. The invention furthermore relates to a method of rendering a color image.

BRIEF DESCRIPTION OF THE DRAWINGS

These and other advantageous aspect of the invention will be further described using figures, wherein.

DETAILED DESCRIPTION OF THE PREFERRED EMBODIMENTS

Figure 1:
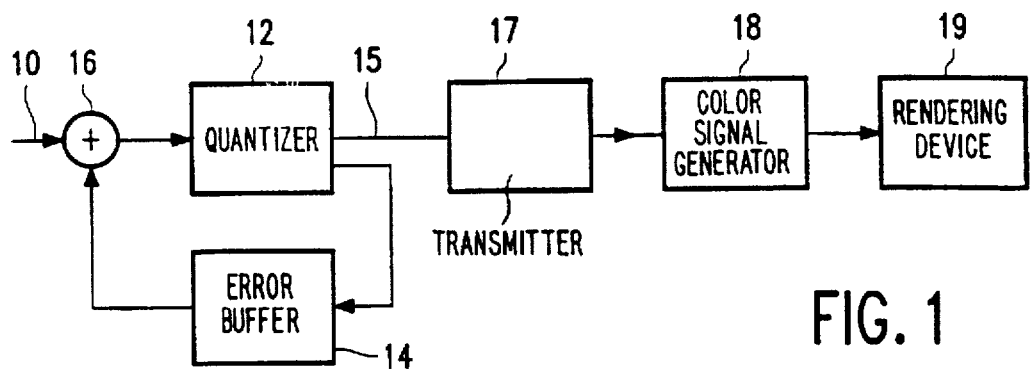
FIG. 1 shows an image rendering system

FIG. 1 shows an image rendering system. This image rendering system comprises an input 10 which is coupled to a quantizer 12 via an adder 16. A first output 15 of the quantizer 12 is coupled via transmission means 17 to a color signal generator 18, an output of which is coupled to a rendering device 19. A second output of the quantizer 12 is coupled to an error buffer 14, the output of which is coupled to an input of the adder 16.

In operation, an input signal made up of color values of for example three eight bit numbers per pixel is supplied at the input 10. These color values are modified by the adder 16, as will be discussed below, and supplied as an aim color value to the quantizer 12. The quantizer 12 determines a quantized color value which is the closest color value from a palette of for example 256 different colors. A code indicating the quantized color value is then output on the first output 15 of the quantizer 12. In the example using a 256 color palette, the code is made up of 8 bits per pixel. The code is supplied to the color signal generator 18, which is for example a RAMDAC, and which generates a signal for controlling the display of color on the rendering device 19, which is for example a display tube or a color printer.

The transmission means 17 may comprise a memory or a transmission channel. The code on the output 15 of the quantizer 12 may be stored in that memory or transmitted via that transmission channel prior to being supplied to the color signal generator. Because the code requires fewer bits than the signal at the input 10 the quantization process user the quantizer 12 allows considerable savings on the size of the memory or the transmission channel bandwidth.

On its second output, the quantizer 12 outputs the color quantization error, that is, the difference between the color value input to the quantizer 12 and the color that will be displayed by the rendering device 19 in response to the code output on the first output 15 of the quantizer. This difference is fed back to the adder 16 via the error buffer 14.

Figure 2A:
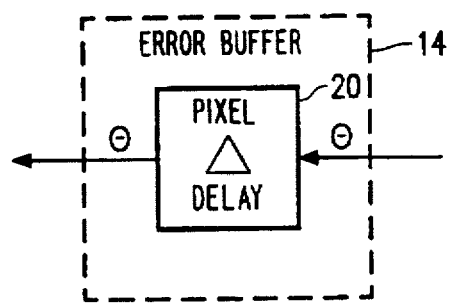
FIGS. 2a–b show various error buffers
Figure 2B:
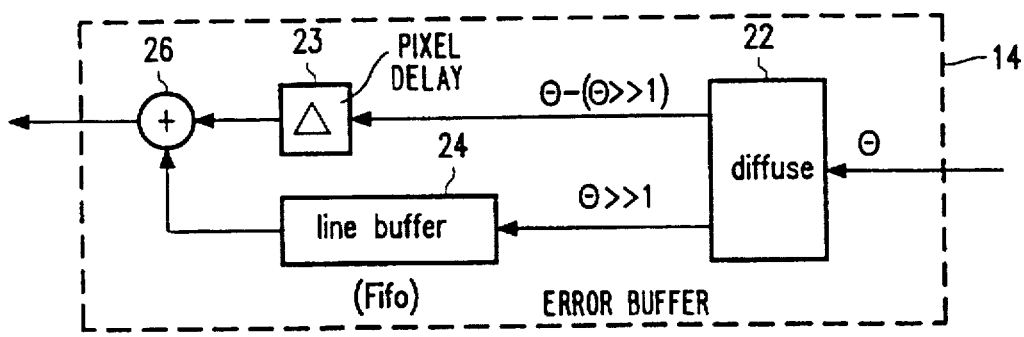

FIGS. 2a–b show various possible implementations for the error buffer by way of example. These implementations are based on the assumption that the pixels of a line in the image are presented successively at the input 10, and that the lines are presented one after the other.

In FIG. 2a, the error buffer 14 consists of a single pixel delay unit 20. In operation this means that all of the color error is diffused to the immediately adjacent pixel on the same line. The input to the quantizer 12 for this pixel will then be new=old+(predecessor−quantized predecessor)

wherein "new" is input to the quantizer 12, "old" is the original color value input to the adder 16, "predecessor" is the color value that was input to the quantizer for the preceding pixel, and "quantized predecessor" is the output of the quantizer on its first output 15 for this preceding pixel.

In FIG. 2b the error buffer 14 comprises a splitting unit 22, which has outputs coupled to a single pixel delay unit 23 and a line delay unit 24, respective outputs of which are coupled to inputs of an adder 26. The output of the adder 26 is the output of the error buffer 14. In operation the splitting unit 22 will output half the color error to each of the single pixel delay unit 23 and the line delay unit 24. Thus, for a particular pixel, the output of the error buffer will be the sum of half the error of the preceding pixel on the same line and half the error of the adjacent pixel on the preceding line.

In this way the image rendering system ensures that the local average of the color values (that is, an average concerning a pixel and its not too distant neighbors) is the same for the color values at the input 10 and on the rendering device 19. A similar effect can be obtained by a process called "ordered dithering" wherein more or less randomly different offsets are added to the original color values before supplying them as aim color values to the quantizer 12.

It has been found that the error buffer of FIG. 2b gives perceptionally more satisfactory results than that of FIG. 2a. More complex error buffers, that spread the error over more pixels (for example on the succeeding) did provide a further improvement over the results obtained with the error buffer of FIG. 2b. But the difference is considerably less than the difference between the images obtained with the error buffers of FIGS. 2a and 2b.

A very important aspect of the image rendering system is the subset (of the set of all available colors) to which the color values can be quantized by the quantizer 12. This subset is called the palette of the system. In the prior art, the system is usually designed to minimize the maximum distance between the RGB value of the palette color used to render the aim color value and the color value itself, that is in terms of the well defined parameters of the rendering device.

However, the quality of the dither process is determined by the differences between the dithered images and the original images that can be seen by the human eye in a standard environment (as regards properties of the display system, room illumination, view distance, eye condition etc.). Hence the distribution of the colors in the palette should be related to the color perception of the human visual system.

This color perception can be modelled by color spaces in which the Euclidean distance between any pair of colors approximates the perceptual distance between these colors. (The Euclidean distance E between two vectors $(X_1,Y_1,Z_1)$ $(X_2,Y_2,Z_2)$ being defined by $E^2=(X_1-X_2)^2+(Y_1-Y_2)^2+(Z_1-Z_2)^2$). Such spaces are called uniform color spaces and try to approximate the real uniform color space of the human visual system, for which no exact simple algebraic formulae are known. One example of a uniform color space is the CIE 1976 (L*u*v*) uniform color space defined by the Commission Internationale de l'Eclairage (which can be found for example in the book titled "Color science: concepts and methods, quantitative data and formulae", by G. Wyszecki, W. S. Styles, 2nd Edition John Wiley and Sons, New York, 1982).

Two main properties of human color perception that are accounted for in these uniform color spaces are:

the human eye is much more sensitive for luminance (brilliance) differences, than it is for chromaticity (hue and saturation) differences, the human eye is much more sensitive for differences in colors with a low luminance (bright colors) than it is for high luminant colors (dark colors).

To minimize the differences between the dithered image and the original image that can be seen by the human eye it is preferred to quantize each color value to the color value from the palette that is nearest to it according to Euclidean distance in L*u*v* space. Moreover, the choice of the colors in the palette itself should also be adapted to the distances in uniform color space. Otherwise, due to the non-linearity in luminance sensitivity dithering based on a palette with colors that are approximately equidistant in a non-uniform color space, such as RGB space or YUV space, will show a relatively large amount of visible dither noise for the darker colors.

To construct a palette which produces the best dither quality in general the following formal quality criterion can be given. The optimal palette from a set of palettes is the palette for which the maximum possible quantization error, expressed as the Euclidean distance is L*u*v* space, is minimal.

The maximum possible quantization error cart be computed using the so-called Voronoi diagram. The Voronoi diagram of a set of points—called Voronoi points—indicates which points in the total space are closest to which Voronoi point.

Figure 3:
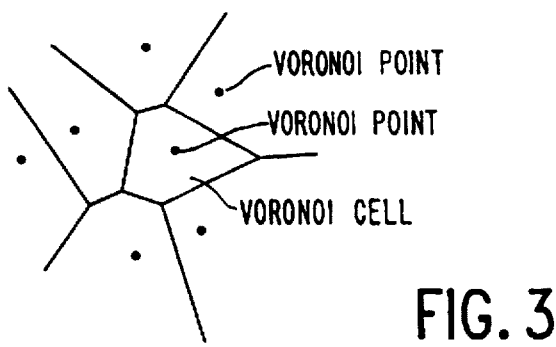
FIG. 3 shows a Voronoi diagram

FIG. 3 shows an example of a 2D Voronoi diagram, which consists of a combination of parts of the perpendicular bisectors between Voronoi points. Such a perpendicular bisector represents the set of points that have equal euclidean distance to both corresponding voronoi points. The area around a Voronoi point is called the Voronoi cell. In a 3D space, the Voronoi cells are separated by parts of the perpendicular bisecting planes.

If the Voronoi points represent the palette colors in the L*u*v* space, then the Voronoi diagram represents the quantization process based on the euclidean L*u*v* error. It indicates which input colors are quantized to which palette color.

Then, it is clear that the maximum quantization error is equal to the maximum distance of the vertices of any Voronoi cell to its corresponding Voronoi point. In this, the translated boundaries of the RGB space must be taken into account also.

Hence, the palette quality can be computed by computing the corners of the Voronoi cell for all palette points.

For construction of the Voronoi cell of a specific Voronoi point, called the target point, the following pragmatic algorithm may be used:

1. Order all Voronoi points in a list, in increasing distance to the target point.

2. Compute the perpendicular bisecting plane between the target point and the first Voronoi point of the ordered list. Next, remove this point from the list. Add the plane to a list of computed perpendicular bisecting planes.

3. Compute the intersection point of every new combination of three computed bisecting planes. These intersection points are potential vertices of the Voronoi cell to compute. Add these vertices to a list of potential vertices.

4. Check for all potential vertices if they are real vertices. This is done by intersecting the line between the potential vertex and the target point with all bisecting planes in the list. If an intersection is found between, then remove the vertex from the list of potential vertices.

5. If the target point is completely surrounded by bisecting planes, then compute the maximum distance to the potential vertices.

6. If the maximum distance is greater than half the distance to the next Voronoi point in the ordered list, then continue with 2. Else, stop the algorithm, because every new bisecting plane will be far enough from the target point, that it can not change the status of the current potential vertices.

The Voronoi diagram is bounded by the RGB space boundaries. So, additionally to the perpendicular bisecting planes, there exists a set of surfaces representing the RGB boundaries, which need to be handled by the algorithm in a way analogous to the bisecting planes.

However, due to the non-linearity between the RGB space and the L*u*v* space, the RGB boundaries are curved surfaces in the L*u*v* space, which are much more complex to handle by the described algorithm. Instead of handling the curved surfaces directly, the algorithm uses per target point a first order approximation of each curved surface, being a plane. Each plane is constructed by taking the local normal vector of the curved surface at the perpendicular projection of the target point on the corresponding RGB boundary.

For target points close to an RGB boundary, the error made by this approximation is small. For target points far away from an RGB boundary, the approximation is quite bad. However, in these cases the RGB boundary is not part of the Voronoi cell, and so it has no influence on the final result.

The construction of the optimal palette can be translated as finding the global optimum towards the described minimization problem (minimization of the maximum quantization error). However, because this is very hard to achieve (if possible at all), the following approach is used to achieve a relatively good local optimum.

An initial distribution of palette colors is be made by placing a homogeneous grid in the L*u*v* space, and changing the grid spacing such that exactly 256 colors lie in the RGB area.

Although this palette is well structured, it is not well distributed in terms of maximum quantization error. To improve this, the following simulated annealing-like process is used: every point (palette color) is shifted with a pre-defined step size in the direction opposite to its nearest neighbour point. This is iteratively repeated with a smaller step size, until the points converge for quality, some decreasing random noise is added to the point movement during the iteration process.

The quality of a distribution is checked by computing the Voronoi diagram as described in 4.3.2. Table 1 shows the results of the iteration process in terms of achieved palette quality.

TABLE 1 palette quality expresssed as maximum quantization error (in euclidean L*u*v* distance)

|  | initial distribution | converged distribution |
|---|---|---|
| max. overall quantization error (max. Voronoi cell size) | 11.2 | 9.0 |
| min. Voronoi cell size | 4.4 | 6.5 |

"Voronoi cell size" means the maximum corner point distance to the Voronoi point of the corresponding Voronoi cell.

Figure 4:
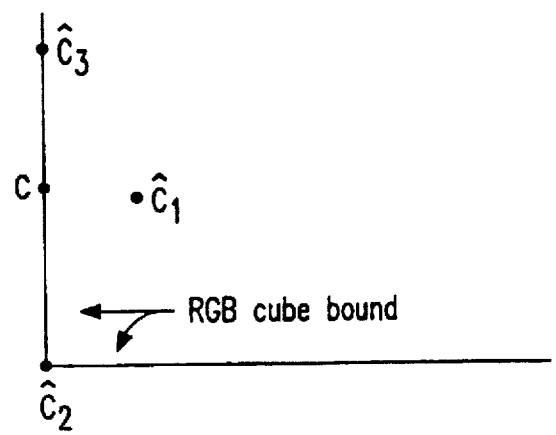
FIG. 4 shows an illustration of boundary quantisation

The quantizer selects for each aim color value the color from the palette that lies closest to it in L*u*v space. When the palette is constructed as described hereinabove, the maximum possible quantization error will be minimized. However, input colours that lie on one of the boundaries of the RGB cube, need to be quantised in a modified way. This can be explained using FIG. 4.

Let the input image have an area with a constant colour c, along one of the RGB cube boundaries, and let $ĉ_1$ be the nearest palette colour to this input colour c with $ĉ_1$ not lying on the corresponding boundary. If $ĉ_1$ is used as quantised output, as would be the case for normal quantisation, then the quantisation error made can not be corrected, because this would involve the need of a palette colour outside the RGB cube.

Hence, to preserve the original colour impression, the surrounding palette colours $ĉ_2$ and $ĉ_3$ should be used instead, despite that this results in a relatively large visible dither noise.

This leads to the following modification in the quantisation process. For an input colour with at least one of the components red, green or blue maximum or minimum, only those CLUT colours should be used within the selection process for the best output colour, that have this red, green or blue value, also maximum or minimum.

Similarly, when at least one of the components is closer to their maximum or minimum in the RGB cube than to $ĉ_1$, one should also use $c_2$ and $c_3$ instead of $c_1$. However, the most frequent case is that at least one component is actually maximum or minimum. Therefore, satisfactory results are obtained even if $c_2$ and $c_3$ are used instead of $c_1$ only when at lest one of the components is maximum or minimum.

An important disadvantage of a uniform space based palette is formed by the complexity of the quantization process, that is, finding the nearest palette color. Especially for hardware implementation of real time video dithering, the quantization process may be too slow. Therefore, it needs to be simplified, and a proper way to do so is to use a table means operating as a memory to model the quantization process. This table means, called the quantization Look Up Table (Q-LUT), contains the quantization level for various input colors. According to the invention, for (near) RGB boundary color values received as aim values at the input of the Q-LUT will contain the nearest RGB boundary color from the palette (even if another color from the palette, which does not lie on the boundary is closer), where for other colors the Q-LUT will simply contain the nearest color from the palette.

To reduce the size of this Q-LUT, the number of entries should preferably be much less than the number of different input colors. Therefore, a snap-mechanism is preferably used to map the input colors to the nearest Q-LUT entry.

Figure 5A:
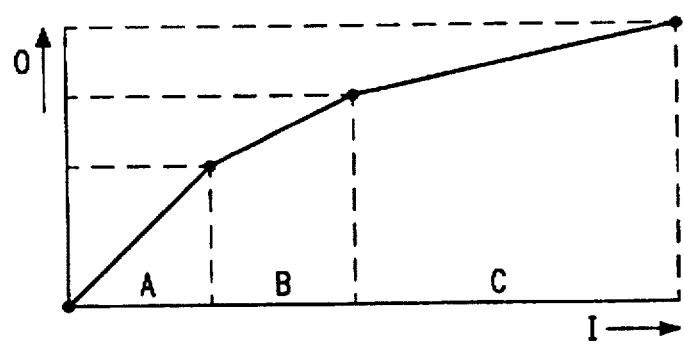
FIG. 5a shows a relation between color component values and snapped color component values
Figure 5:
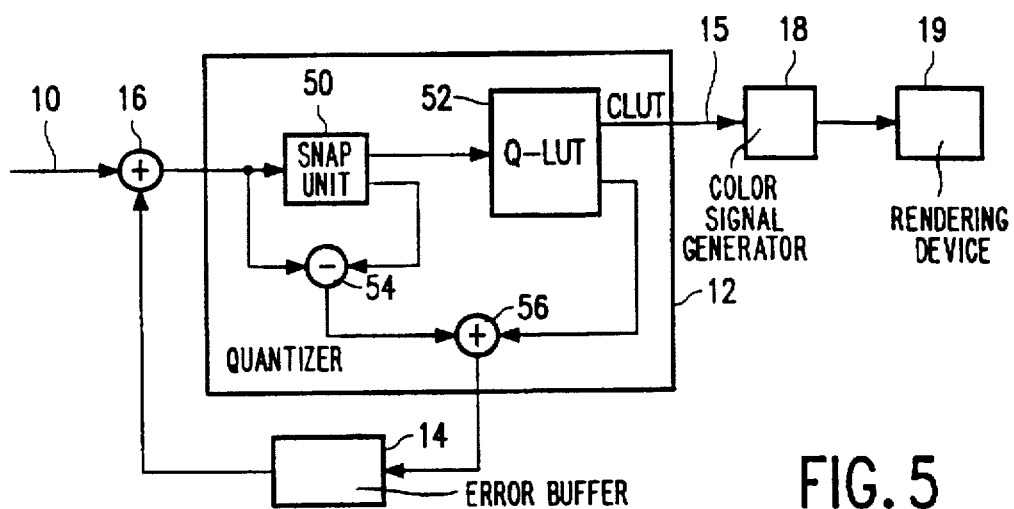
FIG. 5 shows an image rendering system

FIG. 5 shows an image rendering system that makes use of this technique, using the same reference numbers as in FIG. 1, but giving an embodiment for the quantizer 12. The input of the quantizer 12 is coupled to a snap unit 50. The snap unit has an output coupled to a Q-LUT 52 (Quantizer Look Up Table), which in turn has an output coupled to the first output 15 of the quantizer. The input of the quantizer 12 and an output of the snap unit 50 for the snapped color value are coupled to inputs of a subtractor 54. An output of the subtractor 54 and an output of the Q-LUT 52 are coupled to inputs of an adder 56. The output of the adder forms the second output of the quantizer and is coupled to the error buffer 14.

In operation the Q-LUT operates as a memory, to which color values are supplied by way of addresses. The location addressed by a color value stores the code indicating the palette color which lies closest to that color value (with the abovementioned exception for color values that have at least one color component that lies on an RGB cube boundary). This location also stores the error made in quantisation. In response to the color value, the code is supplied to the output 15 and the error is supplied to the adder 56. The snap unit 50 maps the color value received from the adder 16 to the nearest color value for which the Q-LUT stores a corresponding code, for example by discarding a predetermined number of least significant bits from each color component. The difference between the snapped color value and the color value received from the adder 16 is the snap error; it is computed by the subtractor 54, and added to the error output from the Q-LUT 52 in the adder 56. This results in the quantisation error which is supplied to the error buffer 14.

Due to the larger perceptual sensitivity for darker colors, the palette will contain a relatively large amount of colors in the dark area. So, to reduce the size of the Q-LUT, it is preferred to reflect the non-homogeneous distribution of palette colors in the snapping process by which the input for the Q-LUT is determined, or in hardware terms, in the addressing method of the Q-LUT memory. An easily implementable way to realize this is to perform the following conversion for the red, green and blue component each represented by eight bits $(x_7,x_6,x_5,x_4,x_3,x_2,x_1,x_0)$ (most significant bit first):

$$(0,0,x_5,x_4,x_3,x_2,x_1,x_0) \rightarrow (0,x_5,x_4,x_3,x_2,x_1,x_0)$$

$$(0,1,x_5,x_4,x_3,x_2,x_1,x_0) \rightarrow (1,0,x_5,x_4,x_3,x_2,x_1)$$

$$(1,x_6,x_5,x_4,x_3,x_2,x_1,x_0) \rightarrow (1,1,x_6,x_5,x_4,x_3,x_2)$$

The relation between the component value regarded as a number and its converted value also (regarded as a number) is shown in FIG. 5a in which the number represented by the input bit patterns is plotted versus the number represented by the output bit pattern. FIG. 5a shows three value ranges A, B and C of bit patterns starting with 00, 01, and 1 respectively.

Each eight bit value is converted into a seven bit value. For those of the component values that represent the lower color intensities (range A starting with 00) the bit information inclusive of the least significant bit is preserved. As the component values represent higher color intensities (ranges B, C starting with 01 and 1) increasingly more least significant bits are discarded. This conversion implements a discrete logarithm in three levels. After this conversion, some of the least significant bits may be discarded independent of the color intensity in order to arrive at a sufficiently small address for the Q-LUT 52.

Of course other numbers of levels are also possible, wherein the color component values are divided in more than three groups of increasing intensity. In this conversion the bit pattern of the component value is converted into a combination of a code that identifies the group to which the pattern belongs supplemented by a number of its most significant bits that distinguishes within this group. The whole combinations represents a number with a predetermined number of bits. The code that identifies the group is selected such that it contains a smaller number of bits as the intensity values of the group is smaller (that is as the numbers in the group start with a larger number of zeroes). Therefore the number of significant bits that is combined with the code increases as the number of bits in the code decreases.

Figure 6:
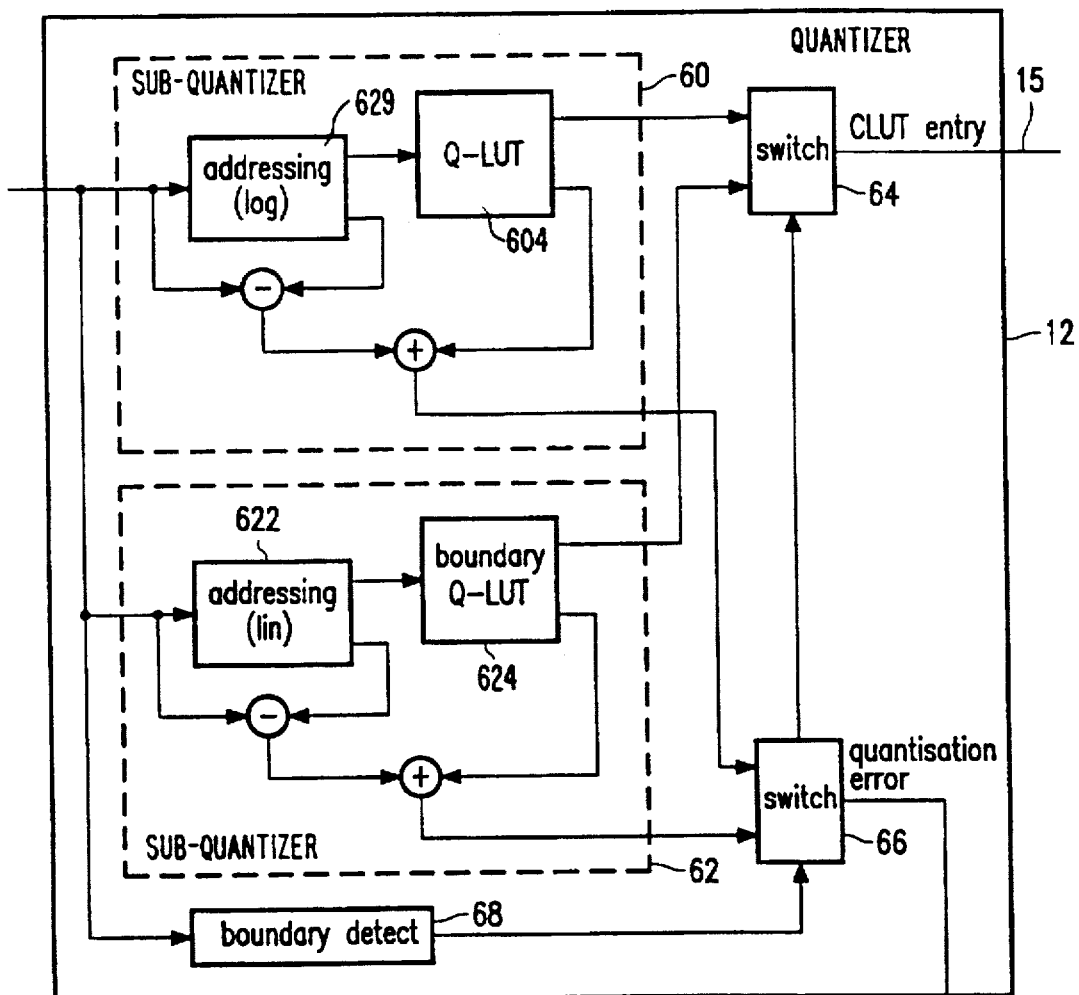
FIG. 6 shows a quantizer that contains two LUTs.

FIG. 6 shows a quantizer 60 that contains two Q-LUTS 604, 624, one 624 for quantizing boundary colors, the other 604 for quantizing the remaining colors. The input of the quantizer 60 is coupled to a first and a second sub-quantizer 60, 62 and to a boundary detector 68. The structure of the sub-quantizers 60, 62 is similar to that of the quantizer shown in FIG. 5. The first outputs of the sub-quantizers 60, 62 are coupled to inputs of a first switching element 64, whose output is coupled to the output 15 of the quantizer 12.

The output of the boundary detector 68 is coupled to a control input of the first switching element 64.

The second outputs of the sub-quantizers 60, 62 are coupled to the inputs of a second switching element 66. The output of the boundary detector 68 is coupled to a control input of the second switching element 66. The output of the second switching element is coupled to the second output of the quantizer 12, for connection to the error buffer 14.

In operation, the boundary detector 68 detects whether the color value supplied to the input of the quantizer 12 is at an RGB boundary. If so, the detector 68 directs the switching elements 64, 66 to connect the outputs of the second sub-quantizer 62 to the outputs of the quantizer 12. If the color value supplied to the input of the quantizer 12 is not at an RGB boundary, the detector 68 directs the switching elements 64, 66 to connect the outputs of the first sub-quantizer 60 to the outputs of the quantizer 12.

The first sub-quantizer 60 operates as described for FIG. 5. It was found that a first sub-quantizer 60 with a Q-LUT with twelve bit addresses (4K entries) yielded satisfactory results for a palette of 256 colors. The second subquantizer 62 needs to handle only color values with two variable color components. As this requires considerably fewer entries for the Q-LUT 624 than for three variable color components, the need for a snap mechanism in the second sub-quantizer 62 is much reduced and the snap unit 622 in the second sub-quantizer 62 is basically needed only to form a two component color value with a selector indicating which color component is maximum or minimum. In particular, it need not be logarithmic.

What is claimed is:

1. An image rendering system, for rendering an image in which each pixel is associated with a respective aim color value, the system comprising:

quantizing means, for mapping each aim color value to a quantized color generally lying perceptually closest to the aim color value in a palette; and a rendering device, for rendering the pixels with the quantized colors, said palette including a proper subset of a set of colors that the aim color values can represent, and containing at least one non-RGB boundary color which is perceptually closer to an RGB boundary color belonging to said set than any other of the colors in the palette, and in case the aim color value lies on the RGB boundary and the closest color in the palette does not lie on the RGB boundary, mapping the quantized color to a next closest color in the palette that also lies on the RGB boundary, said quantizing means comprising:

first and second sub-quantizing means for mapping the aim color value for boundary colors and for other colors respectively, and boundary detection means for detecting pixels whose aim color value lies on the RGB boundary, and for in dependence upon said detecting, selecting which of the first and the second sub-quantizing means determines the quantized color for the rendering device.

2. The image rendering system according to claim 1, the second subquantizing means comprising a first and a second quantizing stage, the first quantizing stage being arranged for determining quantized individual color components values from respective color component values of the aim color value, the second quantizing stage being arranged for determining the quantized color in dependence on the quantized individual color components.

3. The image rendering system according to claim 2, the first quantizing stage being arranged for quantizing color component values representing relatively lower color intensities with lesser maximum quantization error in the color value than color component values representing relatively lower color intensities.

4. The image rendering system according to claim 3, the second subquantizing means comprising a further first and a further second quantizing stage, the further first quantizing stage being arranged for determining quantized individual color components values from respective color components values of the aim color value, with a maximum quantization error which is substantially independent of intensity, the second quantizing stage being arranged for determining the quantized value in dependence on the quantized individual color components.

5. The image rendering system according to claim 4, the first quantizing stage being arranged for replacing a most significant part of a bit pattern representing the color component value with a label having a bit length which increases as the value of the most significant part increases, and complementing the label with a number of lesser significant bits of the bit pattern representing the color component value so as to form a bit pattern having a predetermined bit length independent of the label, representing the quantized individual component.

6. The image rendering system according to claim 3, the first quantizing stage being arranged for replacing a most significant part of a bit pattern representing the color component value with a label having a bit length which increases as the value of the most significant part increases, and complementing the label with a number of lesser significant bits or the bit pattern representing the color component value so as to form a bit pattern having a predetermined bit length independent of the label, representing the quantized individual component.

7. The image rendering system according to claim 2, the quantizing means being arranged for determining the aim color value from an original color value of a pixel in combination with a compensation of a quanitization error of a further pixel neighboring that pixel in the image.

8. The image rendering system according to claim 1, the quantizing means being arranged for determining the aim color value from an original color value of a pixel in combination with a compensation of a quantization error of a further pixel neighboring that pixel in the image.

9. The image rendering system according to claim 8, the quantizing means comprising look up table means, storing indications of quantized colors at respective locations that are addressable by means of the aim color values, the lookup table means also storing the quantization error at each location.

10. A quantization circuit for an image rendering system for rendering an image in which each pixel is associated with a respective aim color value, said quantization circuit comprising:

mapping means for mapping each aim color value to a quantized color generally lying perceptually closest to the aim color value in a palette, the palette including a proper subset of the set of colors that the aim color values can represent and containing at least one non-RGB boundary color which is perceptually closer to an RGB boundary color belonging to said set than any other of the colors in the palette, and, in case the aim color value lies on the RGB boundary and the closest color in the palette does not lie on the RGB boundary, mapping the quantized color to a next closest color in the palette that also lies on the RGB boundary;

first and second sub-quantizing means for mapping the aim color value for boundary colors and for other colors respectively; and boundary detection means for detecting pixels whose aim color value lies on the RGB boundary, and for, in dependence upon said detecting, selecting which of the first and the second subquantizing means determines the quantized color for the rendering device.

11. A method for rendering a image having pixels in which each pixel is associated with a respective aim color value, the method comprising the steps of:

mapping each aim color value to a quantized color generally lying perceptually closest to the aim color value in a palette, rendering the pixels with the quantized colors, said palette including a proper subset of the set of colors that the aim color values can represent and containing at least one non-RGB boundary color which is perceptually closer to an RGB boundary color belonging to said set than any other of the colors in the palette, and in said mapping step:

said mapping of the aim color value for boundary colors and for other colors using first and second sub-quantizing means respectively;

detecting whose aim color value lies on the RGB boundary;

depending upon results of said detecting step, selecting which of said first and said second sub-quantizing means determines the quantized color; and in case the aim color value lies on the RGB boundary and the closest color in the palette does not lie on the RGB boundary, mapping the aim color value to a next closest color in the palette that also lies on the RGB boundary.

* * * * *